Aug. 19, 1969 J. D. CUTHBERT ET AL 3,462,630
ELECTROLUMINESCENT MATERIAL AND DEVICE
Filed April 3, 1967

INVENTORS J. D. CUTHBERT
D. G. THOMAS
BY David P. Kelley
ATTORNEY 3,462,630

ELECTROLUMINESCENT MATERIAL AND DEVICE

John D. Cuthbert, Kinnelon, and David G. Thomas, Summit, N.J., assignors to Bell Telephone Laboratories, Incorporated, Murray Hill, Berkeley Heights, N.J., a corporation of New York Filed Apr. 3, 1967, Ser. No. 627,883
Int. Cl. H01j 1/62, 63/04
U.S. Cl. 313—108 6 Claims

ABSTRACT OF THE DISCLOSURE

Tellurium doped cadmium sulphide crystals produce red light at room temperatures when the tellurium concentration is $10^{19}$ atoms or more per cubic centimeter. The color of the emitted light varies to some extent with the tellurium concentration. Both electroluminescent devices and red phosphors operable at room temperature result.

BACKGROUND OF THE INVENTION

The rapid and expanding developments in many fields requiring optical displays or indicators, such as, for example, the computer field, have necessitated a search for new light emitting devices which perform better or more economically than existing devices. Long life, intensity of illumination, reliability, and simplicity are all desiderata which in one or more particulars are not supplied by the prior art. Incandescent sources are relatively short lived, for example, while gas discharge devices are generally unreliable. Among solid state devices, those that are photoluminescent require an additional light source for excitation and cathodo-luminescent devices are generally far too complicated in their mode of excitation. Furthermore, while some solid state devices can be made to luminesce upon application of a small voltage, they often require extremely low temperatures for a light conversion efficiency sufficient to be of any interest.

SUMMARY OF THE INVENTION

The present invention is a solid state device which emits light at room temperature upon the application of, typically, five to ten volts D.C.

The invention is based upon the discovery that in tellurium doped cadium sulphide, when the doping concentration is in excess of $10^{19}$ Te atoms per cubic centimeter, there are formed recombination centers by Te atoms substituting for S atoms at nearest neighbor sulphur sites. Such a recombination center in the *n* region of an M–*i*–*n* forward biased structure acts to trap a hole swept into the *n* region from the *i* region, which hole then recombines with an electron already present in the neighborhood of the center, the recombination emitting optical radiation.

The light emitted is in the red region of the spectrum, but the actual "redness" of the emitted light can be varied with the tellurium doping concentration.

It is a feature of the present invention that the tellurium doping concentration be equal to or greater than $10^{19}$ Te atoms per cubic centimeter, with which concentrations the cadmium sulphide crystal emits light at room temperatures.

It has also been found that cadmium sulphide doped this heavily with tellurium functions well as a red phosphor under electron bombardment. The degree of "redness" of the phosphor can be controlled by the doping concentration, as well as the conversion efficiency.

The invention will be more readily understood from the following detailed description, taken in conjunction with the accompanying drawings.

DETAILED DESCRIPTION

Figure 1:
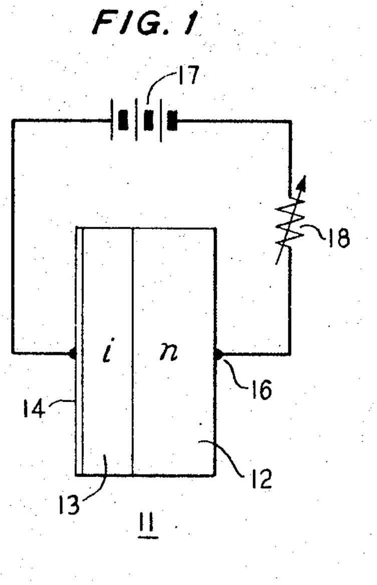
FIG. 1 is a schematic view of a device embodying the principles of the invention.

FIG. 1 is an illustration of a simple electroluminescent device embodying the principles of the present invention which emits light in the red region of the spectrum, e.g., 7300 A. wavelength, at room temperature.

The device 11 of FIG. 1 comprises a crystal of cadmium sulfide (CdS) having an n-type conductivity region 12 and an i-type region 13. The crystal is made electroluminescent through the addition of tellurium to the crystal to a minimum concentration of $10^{19}$ tellurium atoms per cubic centimeter. The manner in which the tellurium is added and the i- and n-type regions formed will be discussed more fully hereinafter.

Electrical contact is made to the i-type region by, for example, an evaporated platinum or other metal layer 14, while contact to the n-type region may be made by any suitable means, such as, for example, a gold contact 16. Layer 14 is connected to the positive terminal of a suitable voltage source 17 while contact 16 is connected through a variable resistor 18 to the negative terminal of source 17.

In operation, when a sufficient voltage, e.g., 5 to 10 volts D.C., is applied to crystal 11, it emits red light. It is believed that when the voltage is applied the i-region avalanches, creating holes and electrons. Because of the high fields generated in the thin i-region, the holes created by the avalanching are swept into the n-region. Because of the tellurium doping concentration in the n-region of the cadmium sulphide, luminescent centers exist which comprise pairs of tellurium atoms on nearest neighbor sulphur sites. The holes swept into the region are trapped at the centers, and electrons in the region are attracted thereto, where they recombine with the holes to emit recombination radiation.

Figure 2:
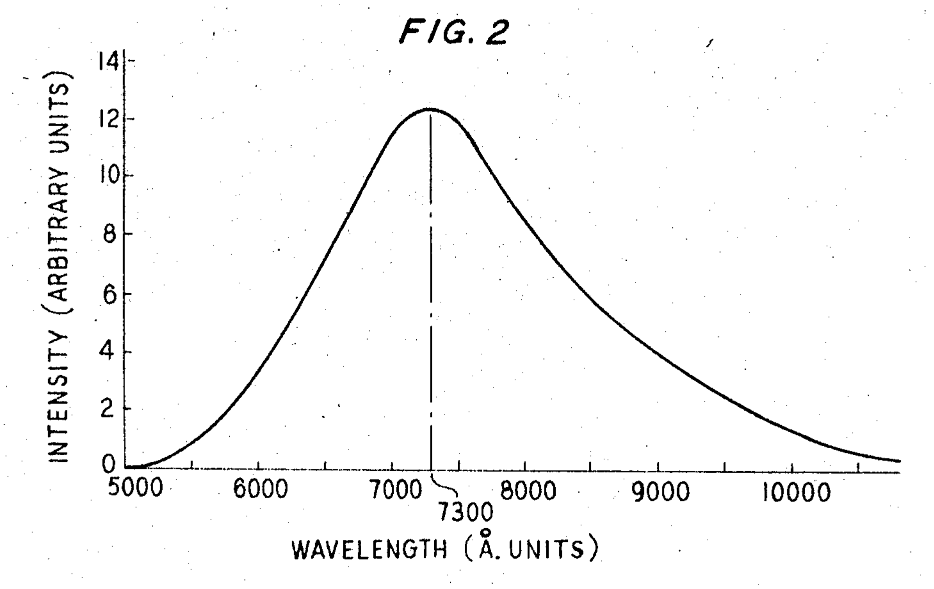
FIG. 2 is a graph depicting the performance of the device of FIG. 1.

In FIG. 2 there is shown an excitation curve for the device of FIG. 1 having a tellurium concentration of $1\times10^{20}$ atoms per cubic centimeter and operated at room temperature. The abscissa is in angstroms and the ordinate is in arbitrary units of magnitude. For the particular doping specified, it can be seen that peak emission is at approximately 7300 A. The measured efficiency of light output was approximately 36%.

As pointed out before, the color of the output light can be varied to some extent by the degree of tellurium doping. The efficiency also varies with doping. Thus, for dopings close to $2\times10^{19}$ Te/cc., the output light is of the pinkish red color of a neon blub and the efficiency is approximately 44%. For a doping near $6\times10^{20}$ Te/cc., the output light is a deep red color and the efficiency is approximately 35%.

It has been found in practice that close control over the tellurium concentration can be maintained by growing the crystals in a three zone furnace. Argon gas is passed at a rate of approximately one liter per minute through a quartz tube that passes through all three zones of the furnace. Cadmium telluride is contained within a boat in the tube in the first zone of the furnace, which is at approximately 1000° C. At this temperature the cadmium telluride vaporizes and is carired with the argon into the second zone of the furnace which is at approximately 1100° C. Within the tube in this zone is a boat containing cadmium sulphide which at this temperature evaporates and is picked up by the flowing gas. The third zone of the furnace is maintained at approximately 800° C., at which temperature the vaporized materials in the argon stream condense on the inner walls of the quartz tube in the form of tellurium doped cadmium sulphide crystals.

The concentration of tellurium in the crystals thus formed is controlled by the temperature in the first stage of the furnace. Thus increases in temperature produce an increase in the tellurium concentration. The temperatures given here produce a concentration of the order of $5\times10^{19}$ atoms per cubic centimeter.

After the crystals are removed from the quartz tube, they are cut to suitable shape, such as the shape in FIG. 1. Ordinarily, such crystals are of n-type conductivity as produced. If the process described fails to produce n-type crystals, the addition of indium to the cadmium sulphide in the second stage of the furnace will insure n-type conductivity crystals.

The i-type layer of the device of FIG. 1 may be formed by annealing the crystal in sulphur vapor at approximately 700° C. until the desired thickness of the i-type layer is achieved. Before contact 16 is attached to the crystal, it is necessary to remove the i-type layer from one face of the crystal, thereby exposing the n-type layer, the exposed surface of which is then etched and polished.

The discussion thus far has dealt with electroluminescent devices as shown in FIG. 1. Because of high efficiencies achieved, and the controllability of the color of the light emitted, cadmium sulphide doped with tellurium of a concentration of $10^{19}$ atoms per cubic centimeter or more lends itself readily to use as a red phosphor in color television tubes, for example. Electron beam bombardment produces relatively high efficiency red light in the material. This proposed use would not, of course, be practical if the material did not operate at room temperature.

From the foregoing it can readily be seen that an efficient electroluminescent room temperature material is realized from application of the principles of the invention. Various arrangements, uses, or devices may occur to workers in the art without departure from these principles. For example, under certain conditions A–C excitation might be used to produce light emission.

What is claimed is:

1. A luminescent device comprising crystalline cadmium sulphide containing tellurium in a concentration of $10^{19}$ atoms or more per cubic centimeter.

2. An electroluminescent device comprising a crystal of cadmium sulphide having an i-type conductivity region and an n-type conductivity region adjacent thereto, said crystal containing tellurium in a concentration of $10^{19}$ atoms or more per cubic centimeter.

3. An electroluminescent device as claimed in claim 2 wherein said n-type region contains indium as a dopant.

4. An electroluminescent device as claimed in claim 2 and further including means for applying a voltage to said crystal sufficient to produce avalanching in the i-type region and the passage of holes into the n-type region from the i-type region.

5. An electroluminescent device as claimed in claim 2 wherein said crystal has an M–*i*–*n* configuration with the n-type region biased negatively with respect to the M region.

6. The process of making electroluminescent crystals for use at room temperatures comprising the steps of vaporizing cadmium telluride and cadmium sulphide, intermingling the materials thus vaporized, and cooling the mixture to produce condensation thereof in the form of tellurium doped cadmium sulphide crystals, the temperature of vaporization of the cadmium telluride being such as to produce a concentration of $10^{19}$ atoms or more per cubic centimeter of tellurium in the cadmium sulphide crystals thus produced.

References Cited

UNITED STATES PATENTS

| | | | |
|---|---|---|---|
| 2,706,792 | 4/1955 | Jacobs | 317—237 X |
| 2,916,678 | 12/1959 | Bube et al. | 317—237 |
| 3,142,586 | 7/1964 | Colman | 117—215 |
| 3,242,368 | 3/1966 | Donald et al. | 313—108 |
| 3,366,819 | 1/1968 | Crowder et al. | 313—108 |

JAMES W. LAWRENCE, Primary Examiner

R. F. HOSSFELD, Assistant Examiner

U.S. Cl. X.R.

117—33.5; 313—92; 317—237, 235